United States Patent [19]
Lang

[11] Patent Number: 5,798,882
[45] Date of Patent: Aug. 25, 1998

[54] REAR-VIEW MIRROR ASSEMBLY WITH INTERNAL ANTENNA MOUNT

[75] Inventor: Heinrich Lang, Seenheimer Strasse Lola, D-91465 Egesheim, Germany

[73] Assignees: Sabine Lang, Chapin, S.C.; Heinrich Lang, Ergersheim, Germany

[21] Appl. No.: 620,872

[22] Filed: Mar. 22, 1996

[51] Int. Cl.$^6$ .............. G02B 7/182; B60R 1/06; H01Q 1/10; H01Q 1/32

[52] U.S. Cl. .......... 359/872; 359/877; 359/881; 359/865; 343/713; 343/715; 343/720; 343/878; 248/479

[58] Field of Search .................. 359/864, 865, 359/872, 877, 881; 343/711, 713, 714, 715, 720, 878, 880, 881, 883; 248/479

[56] References Cited

U.S. PATENT DOCUMENTS

| | | | |
|---|---|---|---|
| D. 353,795 | 12/1994 | Ayala | D12/188 |
| 2,161,771 | 6/1939 | Alexander | 343/720 |
| 2,161,777 | 6/1939 | Sarnes | 343/720 |
| 2,964,746 | 12/1960 | Trudnak, Jr. et al. | |
| 3,188,641 | 6/1965 | Gergely | |
| 3,522,584 | 8/1970 | Talbot | |
| 4,001,831 | 1/1977 | Harvey | 343/715 |
| 4,210,357 | 7/1980 | Adachi | 343/713 |
| 4,678,294 | 7/1987 | Van Nostrand | 359/864 |
| 4,701,037 | 10/1987 | Bramer | 359/877 |
| 4,991,950 | 2/1991 | Lang et al. | |
| 5,110,196 | 5/1992 | Lang et al. | |
| 5,115,352 | 5/1992 | Do Espirito Santo | 359/864 |
| 5,621,577 | 4/1997 | Lang et al. | |

FOREIGN PATENT DOCUMENTS

| | | |
|---|---|---|
| 0567244A1 | 10/1993 | European Pat. Off. |
| 0677428A1 | 10/1995 | European Pat. Off. |
| 1587730 | 3/1970 | France |
| 1998869 | 12/1968 | Germany |
| 6602921 | 7/1969 | Germany |
| 6933364 | 11/1969 | Germany |
| 1960456 | 6/1971 | Germany |
| 2839848B2 | 3/1981 | Germany |
| 2839849B2 | 3/1981 | Germany |
| 4108765A1 | 9/1992 | Germany |
| 93080522 | 9/1993 | Germany |
| 4317314A1 | 4/1994 | Germany |
| 19523416 | 1/1996 | Germany |
| 820162 | 9/1959 | United Kingdom |
| 2157633 | 10/1985 | United Kingdom |
| 9009041 | 8/1990 | WIPO |
| 9100626 | 1/1991 | WIPO |

OTHER PUBLICATIONS

"Mekra" Brocuhre, Mekra Rangau Plastics GmbH & I Co. KG, pp. 1–3 and 15–57, Undated.

Search Report, Application No. 196 02 578.8, dated Jun. 13, 1996.

Abstract, Patents Abstracts of Japan, E–715 Feb. 13, 1989, vol. 13/No. 62; Japanese App. No. 63–250.930, dated Oct. 18, 1988.

PCT International Search Report, Jun. 27, 1997, App. No. PCT/IB97/0034.

*Primary Examiner*—Ricky D. Shafer
*Attorney, Agent, or Firm*—Dority & Manning, P.A.

[57] ABSTRACT

An external rear view mirror for motor vehicles, particularly commercial trucks, includes a support arm and mounting devices for mounting the support arm to the motor vehicle. A housing defining an interior volume is provided with the support arm having a vertical portion extending completely through the housing interior volume. At least one support plate is removably attached directly to the support arm vertical portion. An adjustable mirror assembly is mounted to the support plate front side so as to be variably positionable relative thereto. An antenna mounting bracket is formed integral with and extends from the support plate back side into the housing interior volume. The antenna mounting bracket is configured for receipt of an antenna which extends out of the housing. The entire weight of the antenna and the antenna mounting bracket is supported by the support plate which is in turn attached directly to the support arm.

25 Claims, 3 Drawing Sheets

REAR-VIEW MIRROR ASSEMBLY WITH INTERNAL ANTENNA MOUNT

BACKGROUND OF THE INVENTION

The present invention relates to a rear-view mirror assembly, particularly a rear-view mirror for commercial vehicles such as trucks.

Rear-view mirrors for commercial vehicles, particularly commercial trucks, are well known in the art. These well known mirrors include mirrors which are rotatable either by remote actuation of a motor drive unit or manual adjustment. For example, U.S. Pat. Nos. 4,991,950 and 5,110,196 describe various embodiments of a motor driven adjustable rear-view mirror.

In many instances, it is desirable to combine a vehicle antenna with the rear-view mirror. However, this often proves cumbersome and awkward since conventional commercial rear-view mirrors do not generally accommodate antennas. In these instances, the antennas are typically mounted on the support arms or support brackets for the mirrors and the antenna cable generally runs external to the mirror assembly. Thus, the antenna mount, antenna, and antenna cable can generate significant wind noise and vibrations and are generally unappealing in conventional mirror assemblies. Additionally, conventional rear-view mirror assemblies are not designed to incorporate the additional weight of the antenna and antenna mounting brackets, which further necessitated mounting the antenna and brackets on the support arm, or directly to the vehicle.

The present invention relates to an improved rear-view mirror assembly incorporating an internal antenna, as described herein.

OBJECTS AND SUMMARY OF THE INVENTION

It is therefore a principal object of the present invention to embody a rear-view mirror, particularly for commercial vehicles, wherein an antenna mount is incorporated internal to the mirror assembly.

An additional object of the present invention is to provide an improved remotely adjustable or manually adjustable mirror assembly incorporating an aesthetically pleasing antenna system.

And still another object of the present invention is to provide a rear-view mirror assembly for commercial vehicles which reduces wind noise, vibrations, and drag caused by conventional external antenna mounts.

Additional objects and advantages of the invention will be set forth in part in the following description, or may be obvious from the description, or may be learned through practice of the invention.

To achieve the objects and in accordance with the purposes of the invention, as embodied and broadly described herein, an apparatus of the present invention includes a rear-view mirror for motor vehicles, and particularly for commercial trucks. The rear-view mirror includes a support arm and means, such as conventional brackets, for mounting the support arm to the motor vehicle. A housing is provided which defines an interior volume. The housing may include a back member and a front member with the interior volume defined therebetween. The support arm comprises a vertical portion which extends completely through the housing interior volume in a longitudinal direction. At least one support plate is removably attached directly to the support arm vertical portion. The support plate has a front side and a back side. The housing is attached directly to the support plate, for example, on the back side of the support plate. In the embodiment wherein the housing includes a front member and a back member, the housing front member is removably attached to the back side of the support plate.

An adjustable mirror assembly is mounted to the front of the support plate and is variably positionable relative to the housing and the support plate. The adjustable mirror assembly may include a motor drive mechanism, such as a known servomotor system, for remotely controlling and positioning the rear-view mirror. Additionally, the mirror assembly may comprise a manually adjustable mirror.

An antenna mounting bracket is formed integral with and extends from the back side of the support plate into the interior volume of the housing. The antenna mounting bracket is configured for receipt of an antenna which extends out of the housing. The entire weight of the antenna and the antenna mounting bracket is supported by the support plate, which is in turn attached directly to the support arm.

In a preferred embodiment, the housing is formed of a relatively inexpensive, yet aesthetically pleasing plastic material, and the support plate is formed of a relatively strong metal. Preferably, the antenna mounting bracket is stamped or cast integral with the metal support plate. Alternatively, the antenna mounting bracket can be welded to the metal support plate.

In a preferred embodiment, the housing has a front side which defines an open-faced chamber. The support plate is disposed within this open-faced chamber with the mirror assembly variably positionable in the open face of the chamber relative to the support plate. In this embodiment, a remotely controlled motor drive mechanism may be attached to the support plate within the chamber. The mirror assembly includes a mirror support plate which is attached to the motor drive mechanism, for example to a retaining plate of the motor drive mechanism, for remote variable positioning of the mirror assembly.

The support plates support virtually the entire weight of the mirror assembly, including any motor drive mechanism, antenna mount, antenna, etc. In this regard, the support plate is attached directly the support arm. In a preferred embodiment, the support plate is clamped to the support arm and has at least two clamp blocks defined thereon which extend into the interior volume of the housing for clamping directly to the support arm.

In further accordance with the objects of the present invention, a rear-view mirror assembly is provided which can be mounted directly to an existing support arm of a vehicle, such as a commercial truck. This rear-view mirror assembly is essentially as described above.

The rear-view mirror assembly according to the present invention can incorporate any manner of conventional antennas.

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Figure 1:
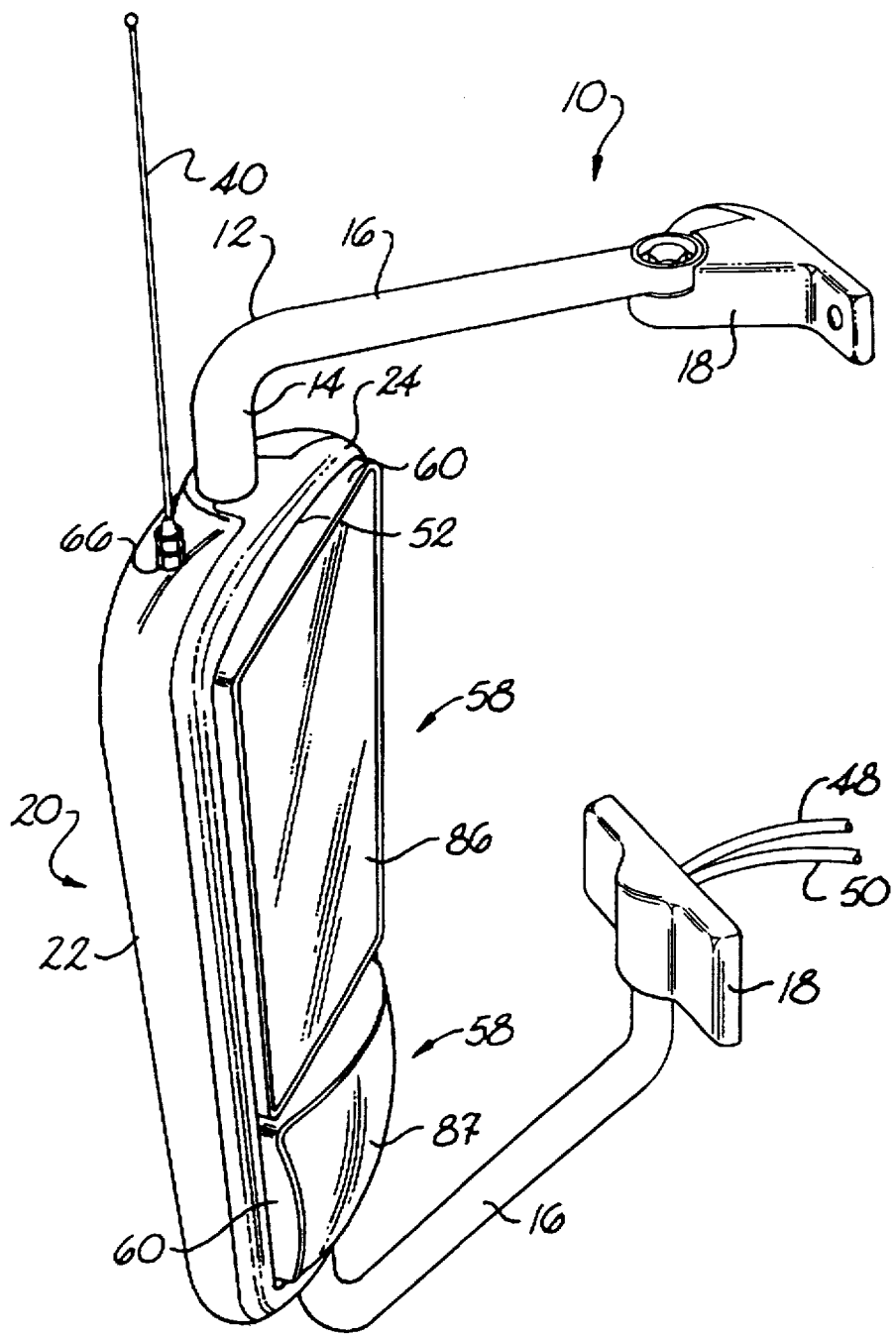
FIG. 1 is a perspective view of a rear-view mirror assembly according to the present invention.

Reference now will be made in detail to the presently preferred embodiments of the invention, one or more examples of which are illustrated in the accompanying drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. The numbering of components in the drawings is consistent throughout the application, with the same components having the same number in each of the drawings.

Referring to FIG. 1 in general, an external rear-view mirror 10 for motor vehicles is illustrated. External rear-view mirror 10 is designed particularly for commercial vehicles, such as commercial trucks. However, it should be understood that this is not a limitation of the invention and that the rear-view mirror described and claimed herein can be used on any manner of vehicle.

Rear-view mirror 10 includes a support arm 12 which is mounted to the cab or frame of a vehicle by any conventional means, such as brackets 18 illustrated in FIG. 1. This aspect of mirror 10 is well understood by those skilled in the art and a detailed explanation thereof is not necessary for purposes of this disclosure.

Generally, support arm 12 includes a horizontal extending portion 16 which extends out from brackets 18 at a distance from the cab of the vehicle. Horizontal portions 16 are joined by a vertically extending portion 14. Preferably, support arm 12 is hollow so that cables 48, 50 can run through the support arm and are thus protected and hidden from view, as will be explained more fully below.

Mirror 10 includes a housing 20, generally illustrated in FIG. 1. Housing 20 can include any number of interconnected components, or may be formed as an integral component. In the preferred embodiment illustrated particularly in FIGS. 2 through 4, housing 20 includes a front member 24 and a back member 22. The front and back members are separable. An internal volume or space 30 is defined between the front and back members, as particularly seen in FIG. 3. The vertical portion 14 of support arm 12 extends completely through interior volume 30, as particularly seen in FIG. 2.

Housing 20 can be formed of any conventional material, and is preferably formed of an inexpensive yet aesthetically pleasing plastic material. Alternatively, housing 20 could be formed of a metal.

In the illustrated embodiment, housing 20, and particularly front housing member 24, defines an open-faced recess or chamber 52 having an open face 56. In the illustrated embodiment, chamber 52 is defined as a pan-shaped chamber and is circumscribed by front wall member 54 of front housing member 24.

At least one support plate 32 is mounted directly to vertical portion 14 of support arm 12. For example, in the embodiments illustrated, support plate 32 is clamped onto vertical portion 14 by way of clamp blocks 78 and clamps 80. Any manner of securely mounting support plates 32 to the vertical portion 14 of support arm 12 may be utilized in this regard. Clamp blocks 78 are formed on back side 36 of support plate 32 and extend through openings 79 (first openings) in wall 54 of housing front member 24 into interior volume 30.

Figure 2:
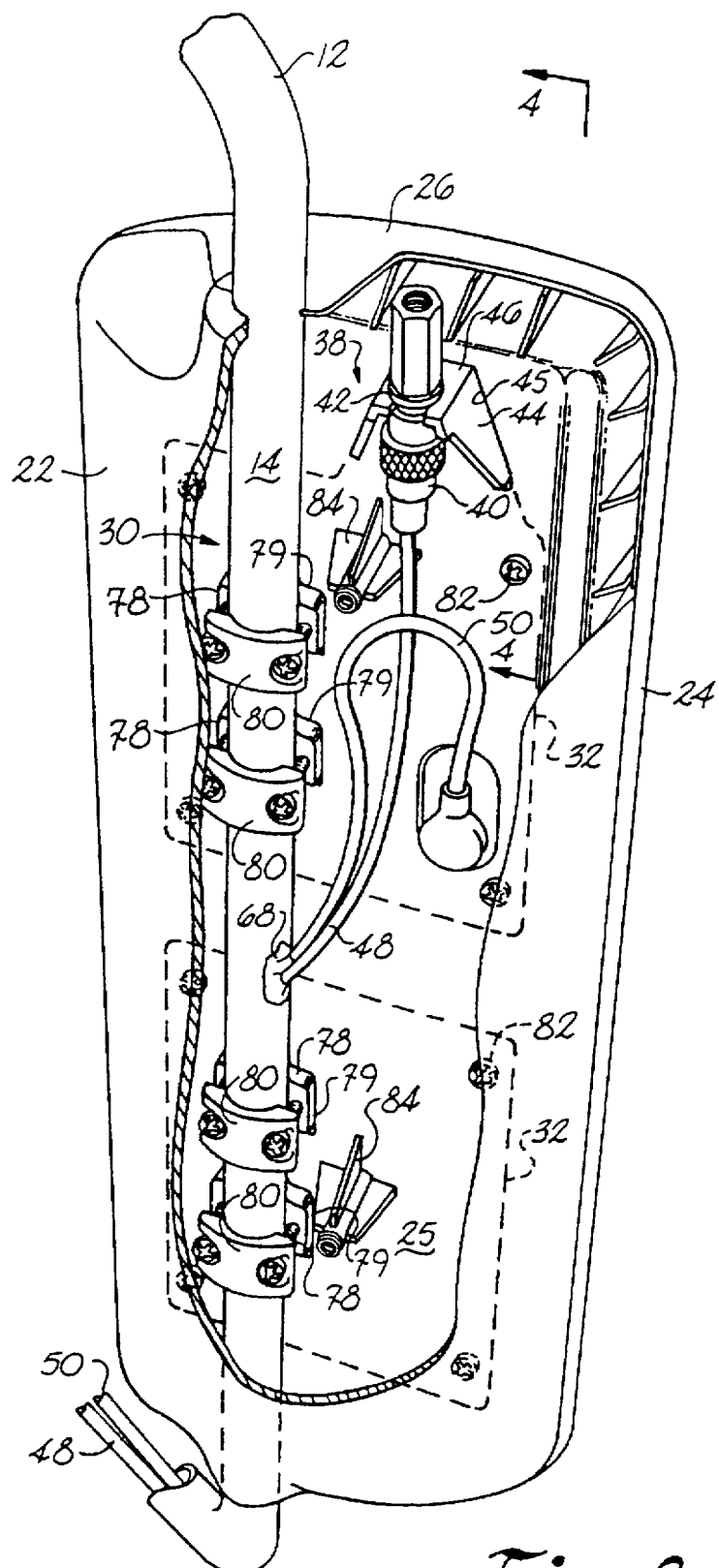
FIG. 2 is a partial cut-away view of the mirror assembly shown in FIG. 1.

Mirror 10 may include two vertically aligned support plates 32, as particularly seen in FIG. 2. The number of support plates 32 depends on the mirror configuration, as will be described in more detail below.

Housing 20 is attached directly to support plates 32. In the embodiment illustrated, housing front member 24 is attached to the back side 36 of support plate 32 by way of conventional screws 82 which screw through the back side 25 of front wall member 54, as particularly seen in FIGS. 2 and 3. In this manner, support plates 32 are disposed or reside in the open-faced chamber 52. In this embodiment, back member 22 of housing 20 is readily removably attached to front member 24 by means of conventional screws 82 and screw mounts 84 defined on back side 25 of front wall member 54, as particularly seen in FIGS. 3 and 4. In an alternative embodiment, back member 22 may snap fit with front member 24 by any manner of known conventional snap fit mechanisms, such as bayonet-type fasteners.

At least one mirror assembly 58 is included with the rear-view mirror 10, as generally seen in FIG. 1. FIG. 1 illustrates an embodiment wherein two mirror assemblies 58 are utilized. Top mirror assembly 58 includes a relatively flat mirror surface 86 vertically aligned over a convex mirror surface 87. Mirror assembly 58 may be remotely motor-driven or manually adjustable, for example by a connector 59, which may be any connector known to one of ordinary skill in the art.

Figure 3:
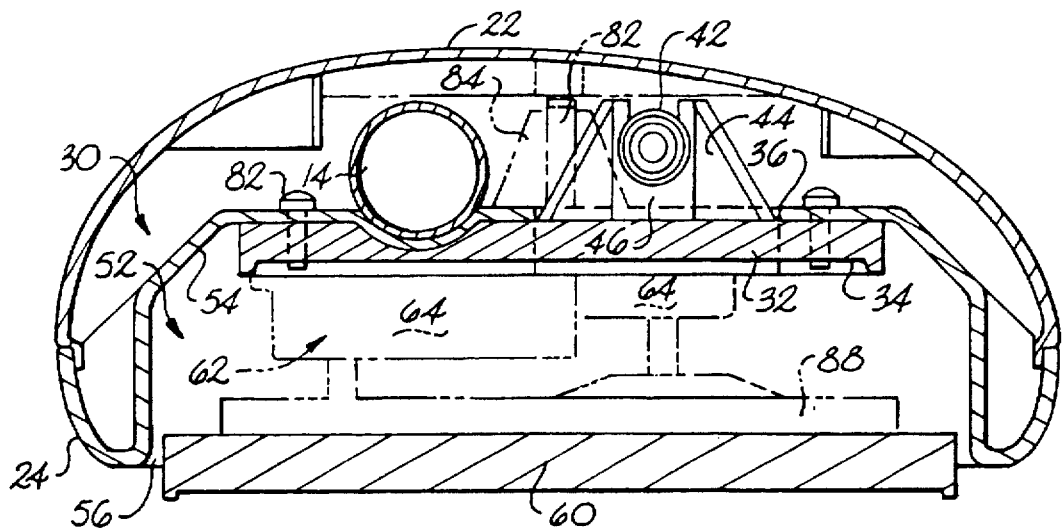
FIG. 3 is an in-line component view of the rear-view mirror assembly shown in FIG. 2.
Figure 4:
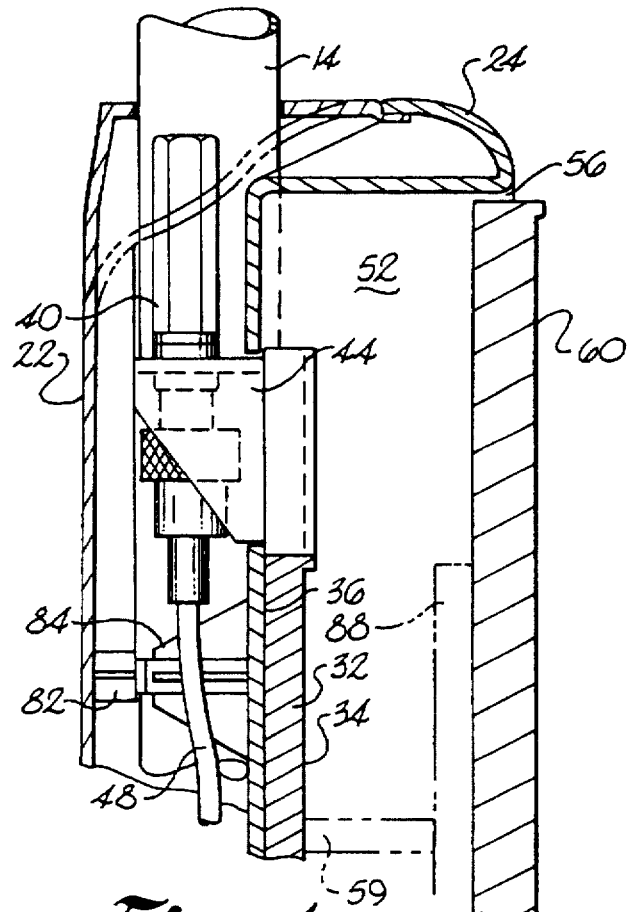
FIG. 4 is a cut-away view of the mirror shown in FIG. 2 taken along the lines indicated.

FIG. 3 illustrates in partial diagrammatic form a remotely adjustable motor-driven mirror assembly. In this embodiment, a motor drive mechanism 62 is attached to front side 34 of support plate 32. One type of motor drive mechanism contemplated within the scope and spirit of the invention is a conventional drive comprising two electric geared servomotors 64, by means of which a retaining plate 88 may be pivoted about two perpendicular positioned axes to carry out an adjustment of mirror glass surfaces 86, 87. These servomotor systems are well known to those skilled in the art and a detailed explanation thereof is not necessary for purposes of this disclosure. It should be further understood that any manner of motor drive mechanism may be utilized in this regard. For example, suitable motor drive mechanisms are described in U.S. Pat. Nos. 4,991,950 and 5,110, 196, which are incorporated herein in their entirety.

Mirror assembly 58 may also include a mirror support plate 60 which is remotely positioned by motor drive mechanism 62, or manually adjustable. In the motor drive embodiment illustrated in the figures, mirror support plate 60 is attached to retaining plate 88. Although not illustrated in the figures, mirror support plate 60 is preferably readily removably attached to retaining plate 88, for instance by means of a sliding lock mechanism. In this regard, chamber 52 is accessed merely by unlocking and removing mirror support plates 60. A suitable sliding lock mechanism is described in co-pending U.S. application Ser. No. 08/245, 952, which is incorporated herein by reference. Mirror surfaces 86, 87 are adhered to the front of mirror support plates 60 by any conventional manner, such as adhesives, retaining lips and like devices, etc.

Referring particularly to FIG. 2, in the motor driven embodiment, a power cable 50 is provided to the motor drive mechanism 62 through the back side 36 of support plate 32. Preferably, cable 50 runs through support arm 12 directly into the motor vehicle.

Rear-view mirror 10 also includes an antenna mounting bracket 38 formed integral on support plate 32. In the embodiments illustrated, bracket 38 is formed on back side 36 of support plate 32. For example, bracket 38 may be molded or stamped integrally with metal support plate 32, or may be welded directly thereto. In the embodiment illustrated, bracket 38 extends from back side 36 of support plate 32 through antenna mount opening (second opening) 45 defined in back wall 54 of front member 24. Antenna mounting bracket is formed by two side members 44 joined by a top member 46. An antenna recess or slot 42 is defined in top member 46. A conventional antenna 40 is slidably fitted into recess 42. As shown particularly in FIG. 1, antenna 40 includes an extending portion which extends out through antenna hole (third opening) 66 formed in a top surface 26 of front member 24 or back member 22 depending on the configuration of the housing. An antenna cable 48 is provided which preferably enters support arm 12 through hole 68 and runs therethrough along with power cable 50. In this manner, it should be understood, that the entire antenna mounting assembly, including bracket, antenna, and antenna cable is supported entirely by support plate 32 which is mounted directly to support arm 12. Additionally, the entire antenna mounting assembly is contained within the interior volume 30 of housing 20. Thus, as particularly seen in FIG. 1, the antenna forms an integral component of the rear-view mirror assembly. The antenna mounting bracket and cable are not external to the mirror and are thus relatively aesthetically pleasing. Additionally, by mounting the components internal to the housing, wind noise and vibration is significantly reduced.

It should also be appreciated that the present invention encompasses a rear-view mirror as essentially described above which can be mounted or retrofitted onto an existing support arm of a vehicle.

It will be apparent to those skilled in the art that various modifications and variations can be made in the apparatus of the present invention without departing from the scope or spirit of the invention. For example, the housing defining the interior volume can include any number of separable components. Additionally, the mirror assembly can include a remote motor drive mechanism or be manually adjustable. Thus, it is intended that the present invention cover the modifications and variations of this invention provided they come within the scope of the appended claims and their equivalents.

What is claimed is:

1. An external rear-view mirror for motor vehicles, comprising:

a support arm for mounting to a motor vehicle;

a housing including a back member, a front member and an interior volume defined therebetween, said support arm including a vertical portion extending completely through said interior volume of said housing in a longitudinal direction, said front member defining an opening therethrough;

at least one support plate removably attached directly to said vertical portion of said support arm, said support plate having a front side and a back side, said front member of said housing being removably attached to said support plate, and said back member of said housing being removably attached to said front member of said housing;

an adjustable mirror assembly mounted to said front side of said support plate so as to be variably positionable relative thereto;

an antenna mounting bracket integral with and extending from said back side of said support plate through said opening in said front member of said housing into said interior volume of said housing, said antenna mounting bracket configured for receipt of an antenna which extends out of said housing, wherein the entire weight of said antenna and said antenna mounting bracket is supported by said support plate which is in turn attached directly to said support arm.

2. The rear-view mirror as in claim 1, wherein said housing is formed of a plastic material and said support plate is formed of a metal.

3. The rear-view mirror as in claim 2, wherein said antenna mounting bracket is stamped or cast integral with said support plate.

4. The rear-view mirror as in claim 2, wherein said antenna mounting bracket is welded to said support plate.

5. The rear-view mirror as in claim 1, wherein said front member of said housing defines an open faced chamber, said support plate being disposed in said chamber with said mirror assembly variably positionable in said open faced chamber relative to said support plate.

6. The rear-view mirror as in claim 5, further comprising a remotely controlled motor drive attached to said front side of said support plate within said open faced chamber, said mirror assembly further comprising a mirror support plate attached to said motor drive for remote variable positioning of said mirror assembly.

7. The rear-view mirror as in claim 1, wherein said support arm is essentially hollow and includes a hole defined therein within said interior volume for receipt of an antenna cable.

8. The rear-view mirror as in claim 1, further comprising an antenna mounted to said antenna mounting bracket within said interior volume, said antenna extending through a top surface of said housing.

9. The rear-view mirror as in claim 1, wherein said support plate is clamped to said support arm, said support plate having at least two clamp blocks defined thereon which extend through said front member for clamping directly to said support arm.

10. The rear-view mirror as in claim 1, further comprising at least two said support plates and at least two mirror assemblies, said support plates being vertically aligned on said vertical portion of said support arm with one of said mirror assemblies associated with each said support plate, said antenna mounting bracket being secured to an uppermost one of said support plates.

11. A rear-view mirror for mounting to a support arm of a motor vehicle comprising:

a housing defining an interior volume and an open faced front chamber and including a wall disposed between said interior volume and said open faced front chamber, said wall defining at least two openings therethrough;

at least one support plate disposed within said open faced chamber, said support plate having at least one clamping mechanism extending through one of said openings into said interior volume for mounting said support plate directly to a vehicle support arm which extends longitudinally through said interior volume, said housing attached directly to said support plate;

a variably positionable mirror assembly configured on said support plate with a mirror glass surface in said open faced chamber; and an antenna mounting bracket integral with said support plate, said mounting bracket extending from said support plate through the other of said openings into said interior volume and configured for receipt of an antenna.

12. The rear-view mirror as in claim 11, wherein said mirror assembly is manually adjustable relative to said support plate.

13. The rear-view mirror as in claim 11, wherein said mirror assembly is remotely adjustable, said mirror assembly further comprising at least one servo-motor adjusting device mounted to said support plate within said chamber and a mirror support plate mounted to said servo-motor adjusting device.

14. The rear-view mirror as in claim 11, wherein said housing comprises a front member and a back member with said interior volume defined therebetween, said front member being attached directly to a back side of said support plate and said back member being removably attached to said front member.

15. The rear-view mirror as in claim 11, wherein said housing is formed of a plastic material and said support plate is formed of metal.

16. The rear-view mirror as in claim 11, further comprising an antenna removably attached to said mounting bracket within said interior volume and extending through a top surface of said housing.

17. An external rear-view mirror for motor vehicles comprising:

a support arm with brackets for mounting to a motor vehicle;

a housing including a concave back member removably attached to a front member which defines a frontal open faced chamber, said housing further having an interior volume defined between said front and back members, said support arm including a vertical portion extending completely through said interior volume of said housing in a longitudinal direction;

at least one support plate disposed within said open faced chamber and removably clamped to said support arm, said support plate having a front side and a back side and at least one clamping mechanism extending from said back side through said front member into said interior volume for clamping engagement with said support arm;

a variably adjustable mirror assembly mounted to said front side of said support plate so as to be variably positionable relative thereto, said mirror assembly having a mirror support plate attached to and variably positionable relative to said support plate, and a mirror glass attached to said mirror support plate in said open faced chamber;

an antenna mounting bracket integral with and extending from said back side of said support plate into said interior volume of said housing;

an antenna removably mounted to said mounting bracket within said interior volume and extending out of said housing, wherein the entire weight of said antenna and said antenna mounting bracket is supported by said support plate which is in turn attached directly to said support arm by said clamping mechanism.

18. The rear-view mirror as in claim 17, further comprising an electric motor drive unit configured on said front side of said support plate for remote variable positioning of said mirror assembly.

19. A rear-view mirror assembly for mounting on a support arm, the rear-view mirror assembly comprising:

a housing including a wall and at least three openings extending through said housing, a first opening and a second opening extend through said wall, and a third opening extends through said housing spaced from said wall;

a support plate for receiving a variably adjustable mirror, said support plate being disposed on a first side of said wall;

a clamping mechanism integral with said support plate and extending through said first opening to secure said support plate to the support arm being disposed in said wall; and an antenna mounting bracket integral with said support plate and extending through said second opening for receiving an end of an antenna, said third opening being disposed for receiving a center portion of the antenna, the entire weight of the antenna and said mounting bracket being supported by the support arm via said support plate.

20. The rear-view mirror assembly of claim 19, further including an antenna having an end secured to said antenna mounting bracket and a center portion extending through said third opening.

21. The rear-view mirror assembly of claim 19, further including a mirror assembly mounted to said support plate.

22. The rear-view mirror assembly of claim 21, wherein said mirror assembly includes a motor drive secured to said support plate and a mirror support plate secured to said motor drive.

23. The rear-view mirror assembly of claim 19, wherein said housing includes a back member attached to said wall, said back member enclosing said clamping mechanism and said antenna mounting bracket within an interior volume of said housing.

24. The rear-view mirror assembly of claim 23, wherein said back member is removably attachable to said wall.

25. The rear-view mirror assembly of claim 23, wherein said third one of said openings extends through said back member.

* * * * *